United States Patent
Schumann

[11] Patent Number: 6,095,312
[45] Date of Patent: Aug. 1, 2000

[54] ADJUSTING DEVICE

[75] Inventor: Peter Schumann, Untersiemau, Germany

[73] Assignee: Brose Fahrzeugteile GmbH & Co. KG Coburg, Coburg, Germany

[21] Appl. No.: 09/319,689
[22] PCT Filed: Dec. 10, 1997
[86] PCT No.: PCT/DE97/02946
 § 371 Date: Jun. 9, 1999
 § 102(e) Date: Jun. 9, 1999
[87] PCT Pub. No.: WO98/25791
 PCT Pub. Date: Jun. 18, 1998

[30] Foreign Application Priority Data

Dec. 10, 1996 [DE] Germany ............. 196 53 722

[51] Int. Cl.⁷ .................................................. F16D 67/02
[52] U.S. Cl. .................. 192/223.4; 192/12 BA; 192/17 D
[58] Field of Search .................. 192/223.4, 17 D, 192/12 BA

[56] References Cited

U.S. PATENT DOCUMENTS

| | | | |
|---|---|---|---|
| 4,614,257 | 9/1986 | Harada et al. | 192/223.4 |
| 4,778,138 | 10/1988 | Yamada | 248/421 |
| 4,926,987 | 5/1990 | Honma | 192/223.4 |
| 4,953,676 | 9/1990 | Yamada et al. | 192/12 BA |
| 5,275,262 | 1/1994 | Ojima et al. | 192/223.4 |

FOREIGN PATENT DOCUMENTS

| | | |
|---|---|---|
| 0 505 090 A1 | 9/1992 | European Pat. Off. . |
| 1 106 138 | 5/1961 | Germany . |
| 19 25 778 | 11/1970 | Germany . |
| 25 261 49 | 12/1976 | Germany . |
| 31 46 289 A1 | 5/1983 | Germany . |
| 86 29 207 U | 2/1987 | Germany . |
| 3632 165 A1 | 4/1987 | Germany . |
| 36 08 858 C2 | 10/1987 | Germany . |
| 37 34 363 C2 | 4/1989 | Germany . |
| 38 19 345 A1 | 12/1989 | Germany . |
| 43 21 335 A1 | 1/1995 | Germany . |
| 2 197 830 | 6/1988 | United Kingdom . |
| 2 211 565 | 7/1989 | United Kingdom . |

Primary Examiner—Charles A Marmor
Assistant Examiner—Saúl Rodriguez
Attorney, Agent, or Firm—Christie, Parker & Hale, LLP

[57] ABSTRACT

Infinitely operating two-way adjusting device having a rive element 1, an output element 2 adjustable in angle by operating the drive element 1, and a stepped switching mechanism mounted between the drive and output elements 1, 2 which contains a fixing device which when the adjusted position is reached by operating the drive element 1 blocks rotation of the output element 2 opposite the direction of rotation of the drive element 1. The infinite stepped switching mechanism has a coupling device 5, 6 which is connected to the output element and during operation of the drive element 1 can be connected in force-locking engagement with same, and has a brake device 3, 7 which when the drive element 1 is resting blocks the coupling element 5, 6 with force-locking engagement. (FIG. 1).

12 Claims, 3 Drawing Sheets

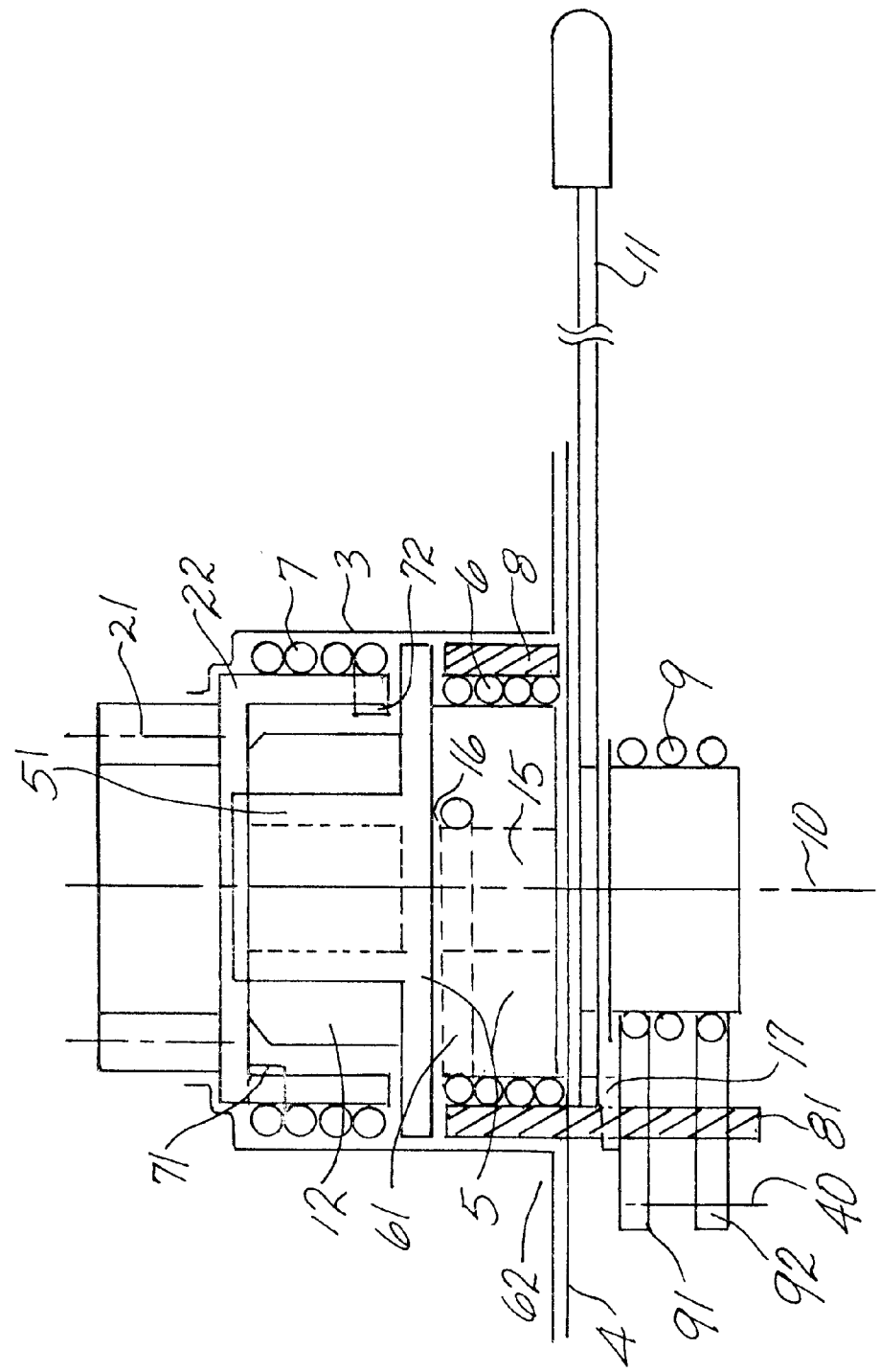

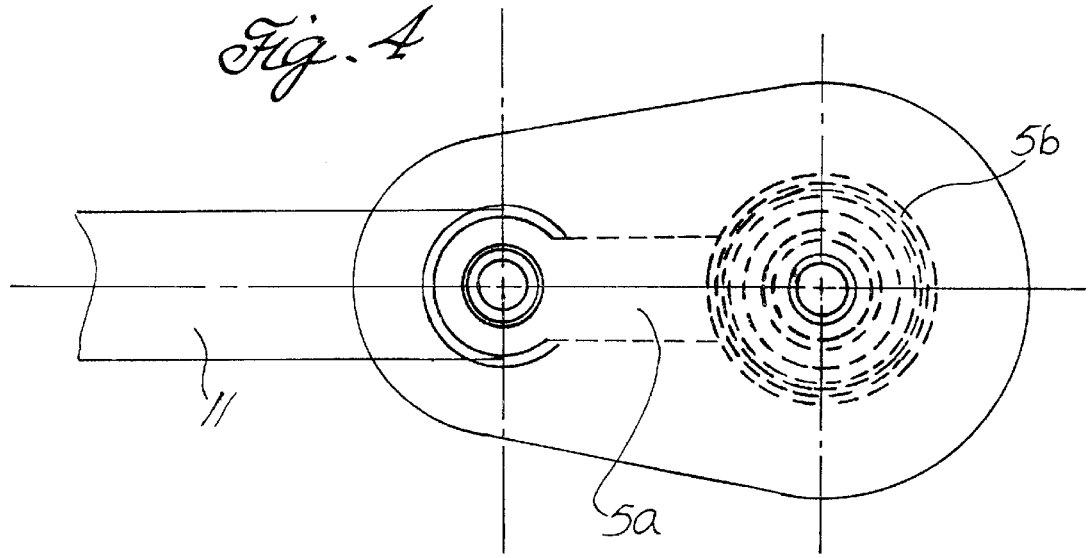
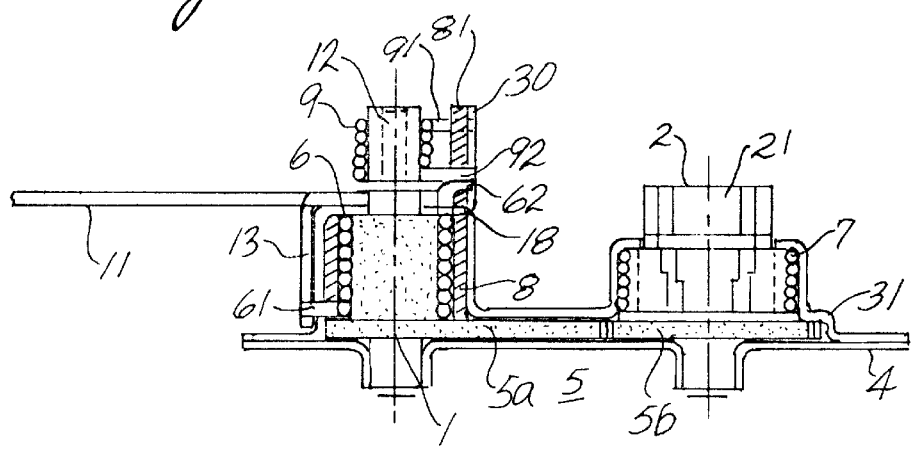

ADJUSTING DEVICE

DESCRIPTION

The invention relates to an infinitely operating two-way adjusting device according to the preamble of claim 1.

From DE 36 08 858 A1 an adjustable and fixable stepped switching mechanism for adjusting the seat height or backrest rake of vehicle seats is known which has a first articulated arm serving as a frame in which a shaft is mounted which is connected rotationally secured to a second articulated arm, and a toothed setting wheel for adjustment as well as an operating arm with two entrainment members. Between the shaft and setting wheel there are two coil springs which resiliently adjoin a bush socket and are arranged in opposite directions and with play on each side adjoin the shaft through one end area and a stop rotationally connected to the setting wheel by the other end area. When the operating arm is swivelled, achieved by swivelling to and fro ('pumping') a handle rigidly connected to the operating arm, the stop first strikes the coil spring which would lock rotation of the shaft in the same rotary direction, then during continued swivel movement unlocks this coil spring and transfers the further swivel movement to the shaft.

As a result of the toothed engagement between the entrainment members and the toothed setting wheel the self-locking stepped switching mechanism known from DE 36 08 858 A1 allows solely a stepped adjustment of the seat height or backrest rake. Furthermore as a result of its special method of functioning the known stepped switching mechanism does not allow any variation in the structural shape for different installation depths and transmission ratios of the force transfer from the operating lever to the shaft.

It is an object of the present invention to provide a self-locking stepped switching mechanism of the kind already mentioned which is capable of infinite adjustment and which can be manufactured cost-effectively and in different variations through a modular construction and the ability to use punched and deep drawn parts.

This is achieved according to the invention through the features of claim 1.

The solution according to the invention allows an infinite adjustment of the self-locking stepped switching mechanism and enables through the modular construction and the ability to use punched and deep drawn parts a cost-effective effective manufacture and different structural shapes to be produced for the different structural depths, surfaces and transmission ratios.

In order to produce a flat adjusting device having a minimal diameter the coupling device is mounted concentric with the brake device.

As an alternative the coupling device can be mounted coaxial and axially off-set relative the brake device. This embodiment is characterised by an overall small diameter and is particularly suitable for assemblies where there is restricted radial space.

In a further alternative the coupling device and the brake device can be mounted side by side and connected together through a positive locking connection device whereby a translation is produced between the drive and output side of the adjusting device which on the one hand minimises the play on the drive side of the adjusting device and on the other produces practically any type of transmission ratio between the drive and output side for adjusting the drive force or adjustment path.

An advantageous development of the solution according to the invention is characterised in that the infinitely operating stepped switching mechanism contains a resetting device which when the coupling device is blocked moves the drive element back into the starting position prior to the adjustment movement.

Resetting the drive element when the coupling device is blocked makes 'pumping' easier in a setting of the drive element which is advantageous for the user, whereby the infinite adjustment allows any type of angular setting of the drive element.

One design of the coupling device is characterised by an entrainment member mounted coaxial with the drive axis of the drive element and by a drive spring, formed as a loop spring, embracing the entrainment member and connected in keyed engagement with the drive element.

The coaxial arrangement of the entrainment member in relation to the drive axis of the drive element and its force-locking connection during operation of the drive element with the drive spring produces the prerequirements for different structural shapes of the adjusting device and a simple and cost-effective construction of the adjusting device. The individual component parts can thereby be formed substantially as deep drawn parts so that a simple inexpensive production of the adjusting device is guaranteed.

An advantageous design of the brake device is characterised by a brake spring, formed as a loop spring, connected in keyed engagement with the entrainment member and the output element and adjoining with force-locking engagement a locally fixed housing part when the drive element is resting.

This design of the brake device also allows different structural shapes of the adjusting device with a simple cost-effective design of the brake module for an infinite stepped switching mechanism.

An advantageous design of the resetting module is characterised by a resetting spring adjoining a shackle of the locally fixed housing part and a shackle of a rotatable sleeve mounted coaxial with the drive axis of the drive element wherein the sleeve is connected in keyed engagement with the drive spring by a shackle and lifts the force-locking contact between the drive spring and entrainment member when the drive force is terminated.

Different structural forms of the self-locking rotary joint fitment can be initially a flat design or a narrow design and a design having different translation of the drive torque.

The idea on which the invention is based will now be explained in further detail with reference to the examples illustrated in the drawings although the concrete embodiment of the inventive idea is not restricted to these examples. In the drawings:

FIG. 3 shows a longitudinal sectional view through a self-locking rotary joint fitment of narrow construction; and FIGS. 4 and 5 show a side view and longitudinal sectional view through a self-locking rotary joint fitment having a transmission gearing between the drive and output element.

FIG. 1 shows a longitudinal section and FIG. 2 a cross-section through an infinitely operating two-way adjusting device having an infinite stepped switching mechanism. For better distinction a part of the function elements of the adjusting device illustrated in FIGS. 1 and 2 is shown shaded and dotted.

Figure 1:
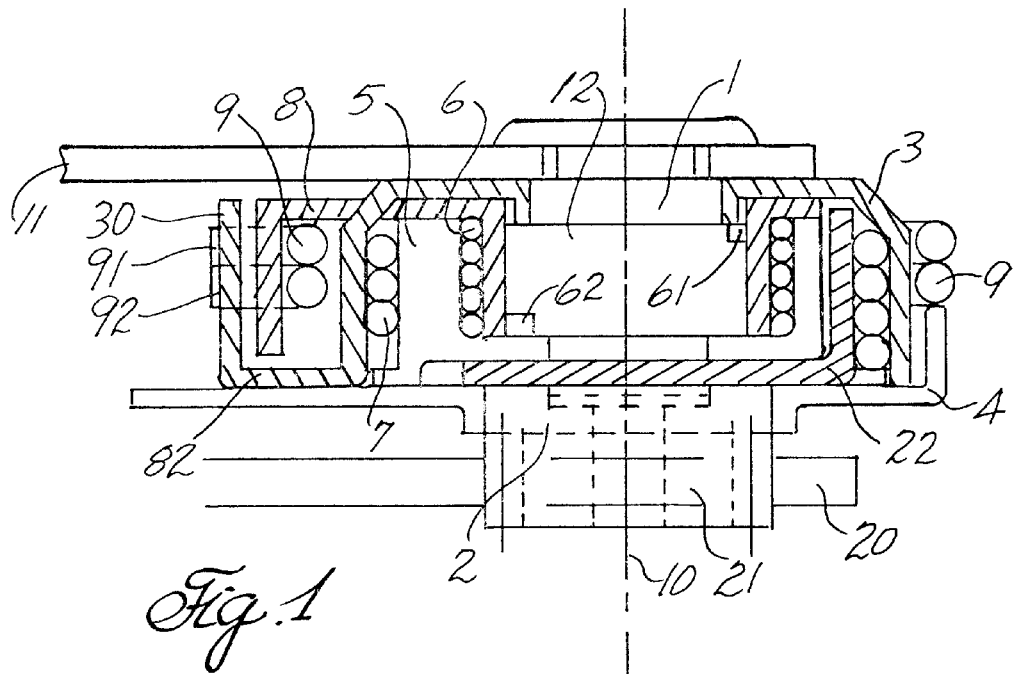
FIGS. 1 and 2 show a cross-sectional view and longitudinal sectional view through a self-locking rotary joint fitment of flat construction.

The adjusting device has a drive element 1 which comprises a drive lever 11 and a drive axis 12 capable of rotating about the rotary axis 10. Coaxial with the drive axis 12 is an output element 2 which consists of a pinion 21 and an output claw 22 connected to the pinion 21 and having stops 23, 24 which oppose the arms of a brake spring 7. The pinion meshes in a manner not shown in further detail with for example the toothed segment of an articulated arm 20 which can be part of a seat height or backrest rake adjusting device in vehicle seats.

Concentric with the drive axis 12 is a coupling device which consists of a dish-shaped entrainment member 5 and a drive spring 6 which is formed as a loop spring. The arms 61, 62 of the drive spring 6 adjoin recesses or stops 13, 14 of the drive axis 12 and are displaced during operation of the drive lever 11 in one or other adjustment direction through the stops 13, 14 of the drive axis 12 to expand the drive spring 6 so that this adjoins with force-locking engagement against the inner side of the cylindrical part of the dish-shaped entrainment member 5.

A brake device consisting of a brake spring 7 formed as a loop spring, and a housing part 3, acting as a brake housing, is likewise mounted concentric with the drive axis 12 of the drive element 1. The arms 71, 72 of the brake spring have a minimum play relative to the stops 51, 52 of the entrainment member 5 and have a greater play relative to the stops 23, 24 of the output claw 22. Since the brake spring 7 in the rest state, i.e. when the drive lever 11 is not activated, adjoins with force locking engagement against the inner wall of the cylindrical part of the dish-shaped brake housing 3, with a slight rotary movement of the entrainment member 5 the brake spring 7 is reduced or compressed in its outer diameter and thus the force-locking contact against the inner wall of the housing part or brake housing 3 is lifted.

A rotatable sleeve 8 is likewise provided concentric with the drive axis 12 and is formed dish-shaped and has a first entrainment shackle 81 which abuts with play against the arms 61, 62 of the drive spring 6. A second outwardly angled entrainment shackle 82 serves to bear against a resetting spring 9 which is mounted concentric with the drive axis 12 and is placed around the outer wall of the cylindrical part of the brake housing 3 with its arms 91, 92 adjoining both the second entrainment shackle 82 of the rotatable sleeve 8 and the shackle 30 of the brake housing 3.

Figure 2:
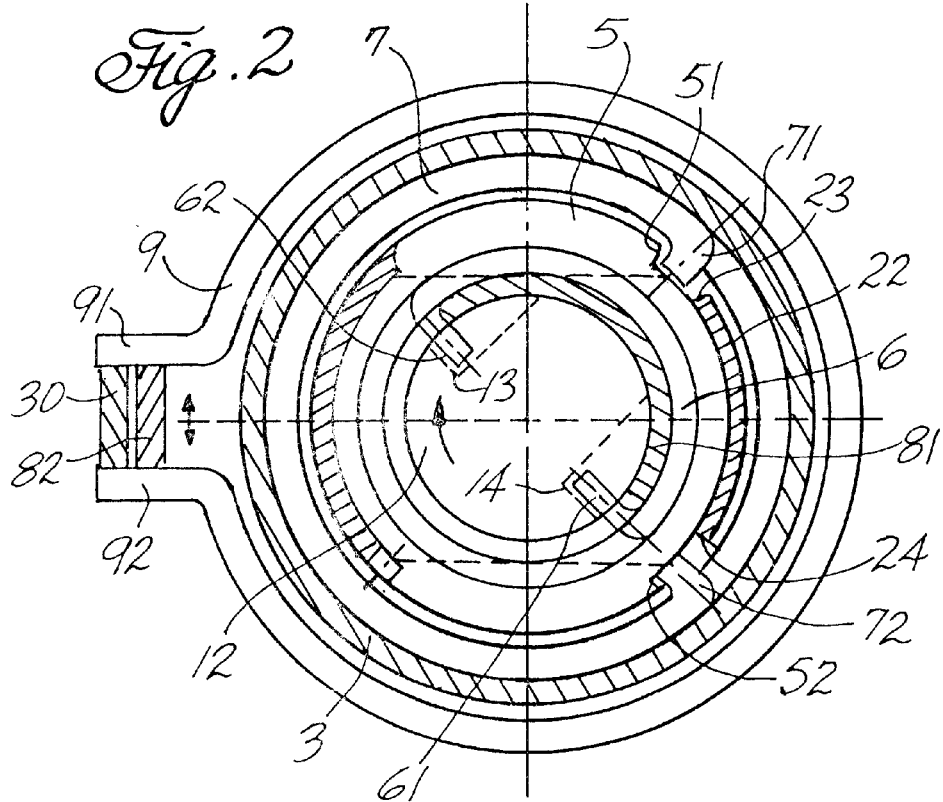

The method of functioning of the adjusting device having the infinite stepped switching mechanism illustrated in FIGS. 1 and 2 will now be explained.

In the rest position, i.e. when the drive lever 11 is not activated, the drive spring 6 adjoins—as already explained—the inner wall of the entrainment member 5 with force-locking engagement, and the brake spring 7 adjoins the inner wall of the brake housing 3 with force-locking engagement. During activation of the drive lever 11 the drive axis 12 is deflected in the one or other rotary direction and with one or other stop 13, 14, which form with play a positive locking connection with the arms 61, 62 of the drive spring 6, causes the drive spring 6 to widen out so that it bears against the entrainment member 5 with force-locking action. As a result of the positive locking connection of the arms 61, 62 of the drive spring 6 with the stops 13, 14 of the drive axis 12 the entrainment member 5 follows the rotary movement of the drive axis 12.

The positive locking connection of the stops 51, 52 of the entrainment member 5 with the arms 71, 72 of the brake spring 7 causes, during deflection of the entrainment member 5, the brake spring 7 to compress so that this is released from its force-locking engagement against the inner wall of the brake housing 3 and the entrainment member follows substantially unbraked the rotary movement of the drive axis 12 and transfers this rotary movement to the output element 2 through positive-locking contact of the entrainment member 5 against the shackle 22 of the pinion 21. During rotary movement of the entrainment member 5 the brake spring 7 thereby slips with friction action on the brake housing 3.

Since the arms 91, 92 of the resetting spring on one side adjoin the shackle 30 of the brake housing 3 and on the other side the second entrainment shackle 82 of the sleeve 8 and the first entrainment shackle 81 of the rotatable sleeve 8 is connected with play to the arms 61, 62 of the drive spring 6, during rotary movement of the drive lever 11 and thus of the drive axis 12 the resetting spring 9 is tensioned and the rotatable sleeve 8 is thereby pretensioned against the brake housing 3. As a result of this pretension the rotatable sleeve 8 is turned back into its starting position when the drive force on the drive lever 11 is terminated. The sleeve thereby compresses with its first entrainment shackle 81 the drive spring 6 in both rotary directions so that the force-locking connection between the drive spring 6 and the entrainment member 5 is lifted.

The drive axis 12, which is connected through the first entrainment shackle 81 of the rotatable sleeve 8 with play to the rotatable sleeve 8, and thus the drive lever 11 follow the resetting movement of the rotatable sleeve 8 as a result of the spring force of the resetting spring 9 until the relaxed state of the resetting spring 9 is reached.

As a result of the compression of the drive spring 6 through the first entrainment shackle 81 of the rotatable sleeve 8 and the resulting lifting of the force-locking contact between the drive spring 6 and entrainment member 5, the entrainment member 5 and the shackle 22 of the output element 2 connected rotationally secured to the pinion 21 are uncoupled from the resetting movement of the sleeve 8 as well as the drive axis 12 and drive lever 11 so that the output element 2 is locked in the deflected position.

If a greater torque acts on the output element 2 than on the drive element 1 then the contact bearing edges 23, 24 of the claw 22 connected to the pinion 21 abut the arms 71, 72 of the brake spring 7 in the direction of widening the brake spring 7 so that their force-locking contact against the inner wall of the brake housing 3 is intensified and thus the moment acting on the pinion 21 of the output element 2 is blocked.

This effect also occurs if at the end of the adjustment movement of the drive lever 11 the resetting of the drive lever 11 takes place in the manner described above and the entrainment member 5 and thus the pinion 21 are uncoupled from the resetting movement. A torque exerted on the pinion 21 during the resetting movement of the drive lever 11 would immediately result in the brake spring 7 contacting the brake housing 3 with force-locking action so that the pinion 21 of the output element 2 locks in the deflected position. Only a movement of the drive lever 11 in the opposite direction would lead to a return of the deflection position of the output element 2 in the manner described above.

The embodiment shown in longitudinal section in FIG. 3 is characterised by its overall small diameter and is particularly suitable for arrangement where there is reduced radial space. In this embodiment the individual structural groups, more particularly the spring elements, are arranged not concentrically but coaxially with the drive axis 12 or rotary axis 10. The interaction of the individual function modules of this adjusting device corresponds however to the method of operation achieved in connection with the embodiment described above.

The drive lever 11 has a pin 15 mounted coaxial with the axis of rotation 10 and forming a first stop 16 for the arm 61 of a drive spring 6 mounted concentric with the pin 15. A shackle 17 of the drive lever 11 adjoins the second arm 62 of the drive spring 6 so that during activation of the drive lever 11 in the one or other rotary direction the drive spring 6 pretensioned on the drive axis 12 is connected in force-locking engagement with the drive axis 12.

The drive axis 12 entrains the entrainment member 5 which is connected in keyed engagement therewith and whose claws 51, 52 adjoin the arms 71, 72 of the brake spring 7 which adjoins the brake housing 3 with force-locking engagement in the relaxed state. Through the action of the entrainment member 5 on the brake spring 7 this is released from its force-locking connection on the brake housing 3 so that the torque exerted by the drive lever 11 is transferred to the entrainment member 5 so that the entrainment member follows substantially unbraked the rotary movement of the drive axis 12 and transfers this rotary movement to the output element 2 through the keyed connection between the entrainment member 5 and the shackle 22 of the pinion 21. During rotary movement of the entrainment member 5 the brake spring 7 thereby slips with slight friction action on the brake housing 3.

The resetting spring 9 mounted concentric with a part of the drive axis 12 adjoins with its arms 91, 92 the shackles 81 of the rotatable sleeve 8 as well as the housing cover 4. The sleeve 8 is furthermore connected through the shackle 81 to the arm 62 of the drive spring 6 so that at the end of the adjustment movement through the drive lever 11 in the following resetting movement as a result of the pretension of the resetting spring 9 between the housing cover 4 and the rotatable sleeve 8 or the drive axis 12 the rotatable sleeve 8 is moved back into the rotary direction opposite the adjustment movement and the drive spring 6 is relaxed through the shackle 81 and the arm 62 so that this spring is released from its force-locking connection against the drive axis 12. As a result of the resetting movement of the resetting spring 9 the drive lever 11 is reset in the starting position without the drive axis 12 and thus the entrainment member 5 and consequently the pinion 21 being moved along as well.

During the resetting movement or in the event of a torque on the output side which exceeds the torque on the drive side, the shackle 22 of the pinion 21 acts directly on the arms 71, 72 of the brake spring 7 whereby the brake spring 7 is expanded. The brake spring 7 thereby moves with force-locking connection against the brake housing 3 and the torque exerted by the pinion 21 is immediately broken down.

The embodiment illustrated in FIGS. 4 and 5 shows a structural form with a transmission between the drive and output sides of the adjusting device which on the one hand minimises the play on the drive side of the adjusting device and on the other causes a transmission ratio of practically any kind between the drive and output sides for adjusting the drive force or adjustment path.

In this embodiment the drive spring 6 and the brake spring 7 are mounted side by side and are connected together through a divided entrainment member 5 whose entrainment parts 5a and 5b which are preferably formed as punched parts are coupled in keyed connection with each other through a toothed segment or toothed disc connection. The drive lever 11 acts through a shackle 13 or the lever end 18 on the arms 61, 62 of the drive spring 6 and draws the drive spring 6 with an adjustment movement onto the first entrainment part 5a and causes through the force-locking connection of the drive spring 6 with the cylindrical part of the first entrainment part 5a a transfer of the drive movement exerted by the drive lever 11 to the first entrainment part 5a. At the same time the drive force is transferred to the rotatable sleeve 8 whose rotation pretensions the resetting spring 9 with its arm ends 91, 92 between the rotatable sleeve 8 and the housing part 30.

The drive movement of the first entrainment part 5a is transferred through the gearing of the two entrainment parts 5a and 5b to the other entrainment part 5b which by bearing against the arms of the brake spring 7 compresses the brake spring 7 and thus releases it from its force-locking connection with the housing part 31. With the slipping connection of the brake spring 7 against the housing part 31 the second entrainment part 5b can thereby follow unrestrictedly the drive movement and can transfer this through the keyed connection of the second entrainment part 5b with the pinion 21 to said pinion 21.

In the event of torque exerted on the pinion 21 which is greater than the torque on the drive side the rotary movement starting from the pinion 21 causes the brake spring 7 to expand so that this adjoins the housing part 31 with force locking engagement and thus directly breaks down the torque emanating from the pinion 21.

In the resetting phase the resetting spring 9 acts in the manner described above on the rotatable sleeve 8 which widens out the drive spring 6 and thus lifts the coupling with the first entrainment part 5a. The drive lever 11 is reset through the shackle 81 adjoining the resetting spring 9.

The features of the invention are not restricted to the embodiments described above but extend to combinations of the variations described and those designs which deviating from the design features described above utilise the function elements, more particularly the function modules of the self-locking infinite stepped switching mechanism according to the invention.

What is claimed is:

1. An infinitely operating two-way adjusting device comprising:

a drive element;

an output element, that is adjustable in angle in one or other rotary direction during rotary movement of the drive element; and a stepped switching mechanism mounted between the drive and the output elements;

wherein the stepped switching mechanism contains a coupling device in force-locking engagement with the output element during operation of the drive element and a brake device which blocks the coupling device with force-locking engagement, when the drive element is resting or when torque is introduced on the output side;

wherein the coupling device has a drive spring in active connection with the drive element, and which during operation of the drive element is connected in force-locking engagement with an entrainment member of the coupling device and transfers a rotary movement of the drive element (1) to the entrainment member; and wherein the brake device has a brake spring connected in keyed engagement with the entrainment member and the output element and, when the drive element is resting or in the event of torque on the output side, is supported with force-locking engagement on a locally fixed housing of the adjusting device.

2. An adjusting device according to claim 1 wherein the drive spring and the brake spring are loop springs adjoining with force locking engagement to surfaces of the entrainment member and of the housing, respectively, which are formed to match the shape of the loop springs.

3. An adjusting device according to claim 1 wherein the drive element includes a drive axis; and wherein the entrainment member is mounted coaxial with the drive axis of the drive element, is formed in a claw-like shape and engages with a claw-like coupling element on the output side.

4. An adjusting device according to claim 1 wherein the stepped switching mechanism contains a resetting device, which, after an adjusting movement, returns the drive element to a starting position before a next adjusting movement.

5. An adjusting device according to claim 4 wherein the resetting device includes a resetting spring bearing on a shackle of the locally fixed housing and on a first shackle of a rotatable sleeve mounted coaxial with a drive axis of the drive element; and wherein the sleeve is connected through a second shackle in keyed engagement with the drive spring and lifts the force-locking contact between the drive spring and the entrainment member when the drive force is terminated.

6. An adjusting device according to claim 5 wherein the sleeve, the entrainment member and the housing part are cylinders arranged concentric with each other around the drive axis of the drive element;

wherein the drive spring includes two arms and is mounted around the sleeve and engages by its arms the drive axis;

wherein the entrainment member has at least a pair of contact bearing edges for receiving at least a pair of arms of the brake spring, which embraces at least partially the entrainment member;

wherein the housing part encloses the brake spring;

wherein on a part of the circumference of the entrainment member at least a claw of the output element stops against the arms of the brake spring.

7. An adjusting device according to claim 5 wherein the resetting spring is formed as a loop spring and encloses the housing part; and wherein at least a pair of arms of the resetting spring adjoin the shackle of the housing on one side and the first shackle of the rotatable sleeve on the other side.

8. An adjusting device according to claim 1 wherein a drive axis of the drive element, the housing part, the rotatable sleeve, the entrainment member and the output element are formed substantially cylindrically-shaped and arranged coaxial relative to each other;

wherein the drive spring is mounted between the concentric parts of the output element and the rotatable sleeve and the drive spring is connected in keyed engagement by its arms with shackles of the drive element and the rotatable sleeve; and wherein the brake spring is mounted between concentric parts of the housing part and the entrainment member and adjoins shackles of the entrainment member by its arms.

9. An adjusting device according to claim 5 wherein the resetting spring is formed as a loop spring and encloses the drive axis; and wherein at least a pair of arms of the resetting spring adjoin the shackle of the housing on one side and the first shackle of the rotatable sleeve on the other side.

10. An adjusting device according to claim 1 wherein the drive element comprises a drive axis; and wherein the drive element, the rotatable sleeve, the entrainment member and the output element are arranged in succession in the direction of the drive axis.

11. An adjusting device according to claim 1 wherein the drive element comprises a drive axis; and wherein a first housing part, the drive spring and a first entrainment member are arranged coaxial relative to the drive axis of the drive element;

wherein a second housing part, the brake spring and a second entrainment member are arranged coaxial relative to the axis of the output element; and wherein the first entrainment member and the second entrainment member are connected together.

12. An adjusting device according to claim 11 wherein the axial assembly of the first housing part (30), the drive spring (6) and the first entrainment member is next to the axial assembly of the second housing part, brake spring and second entrainment member.

\* \* \* \* \*